United States Patent [19]

Hochgraf

[11] Patent Number: 4,843,222

[45] Date of Patent: Jun. 27, 1989

[54] BAR CODE READER FOR READING BAR CODE SYMBOLS AT DIFFERENT DISTANCES

[75] Inventor: Neil A. Hochgraf, Rochester, N.Y.

[73] Assignee: Eastman Kodak Company, Rochester, N.Y.

[21] Appl. No.: 868,907

[22] Filed: May 29, 1986

[51] Int. Cl.$^4$ .............................................. G06K 7/10
[52] U.S. Cl. .................................. 235/470; 235/462; 235/472
[58] Field of Search ............... 350/437; 235/470, 462, 235/439, 454, 455, 456, 472, 467; 250/555, 566, 568, 569, 201 DF; 369/45, 46, 112, 120

[56] References Cited

U.S. PATENT DOCUMENTS

| | | |
|---|---|---|
| 2,811,081 | 10/1957 | Praeger .............................. 350/437 |
| 3,876,841 | 4/1975 | Kramer et al. ..................... 369/120 |
| 4,408,120 | 10/1983 | Hara et al. ......................... 235/462 |
| 4,501,493 | 2/1985 | Kubota ............................... 350/437 |
| 4,560,862 | 12/1985 | Eastman et al. .................... 235/462 |
| 4,612,437 | 9/1986 | Ohsato ............................... 369/46 |
| 4,678,288 | 7/1987 | Lonsdale et al. ................... 235/472 |

FOREIGN PATENT DOCUMENTS 59-154573  9/1984  Japan .................................... 235/462

Primary Examiner—Alan Faber
Assistant Examiner—Robert A. Weinhardt
Attorney, Agent, or Firm—John B. Turner

[57] ABSTRACT

A scanning bar code reader which includes a lens and a multi-zone detector. The zones have differing distances from the principal plane of the lens so that one zone will have on it a better focussed image of the bar code symbol than do the others. The zones are electronically scanned. The lens includes a plurality of regions of differing focal lengths and/or different principal planes which promote a magnification which is not directly related to distance of the symbol from the reader. A stop restricts the rays reaching a particular zone of the detector to those which have been refracted by the lens region which gives the best focussed image on the particular zone from a symbol at a predetermined distance.

15 Claims, 3 Drawing Sheets

BAR CODE READER FOR READING BAR CODE SYMBOLS AT DIFFERENT DISTANCES

BACKGROUND OF THE INVENTION

Field of the Invention

This invention relates to bar code readers.

A bar code is a pattern of dark bars and light spaces between the bars, representing numbers and/or letters according to a specific rule. A bar code character is a group of bars and spaces that represent a single number or letter. A bar code symbol is a collection of several bar code characters which represent a required comprehensive identification.

Scanning bar code readers include a detector which produces a series of electronic signals as the symbol is scanned. A first type of reader is known in which the symbol is scanned by a spot of light and the detector senses the entire scene in which the symbol is located. The detector senses the modulation of the light reflected from the spot as the spot traverses the symbol. A second type of reader is one which not only scans the symbol with a spot of light, but scans an image of the detector along with the spot. Such an improved reader has the advantage that the detector only sees a relatively small area around and including the instantaneous position of the spot. A third type of reader is one in which the symbol is uniformly illuminated and an image of the detector is scanned across the symbol. In this third type of reader, the light received by the detector is modulated in accordance with the reflectivity of the bar or space on which the detector is instantaneously imaged.

The ability of a reader to read a symbol satisfactorily is dependent on its resolution; i.e., its ability to read the narrowest bar or space. In the first and second types of reader described above, resolution is dependent on the size and sharpness of the spot of light. In the second and third types of reader, resolution is dependent on the size and sharpness of the image of the detector on the symbol. If the diameter of the light spot or the width of the detector image is much greater than the width of the narrowest bar or space and/or the light spot or detector image is not sharply defined, then the modulation of the light incident on the detector as the light spot and/or detector image scans the narrowest bar or space may be inadequate to provide a signal from the detector which is adequately modulated for the interpretive electronics to which it is fed. Thus, two problems occur when endeavoring to increase the range over which a reader reads satisfactorily; one concerns focussing and the other concerns magnification.

SUMMARY OF THE INVENTION

It is an object of the various aspects of this invention to overcome these problems.

In a broad aspect, the invention consists of a reader including lens means and a detector. The detector includes a plurality of zones scannable in sequence and located at different distances from the lens means. In use, the reader is moved so that the image of the symbol moves across the zones. The arrangement is such that whatever the distance of the symbol, within a working range, the image of the symbol will be sharp on at least one of the zones. At least the zone on which the image of the symbol is sharp will give a sufficiently highly modulated signal for the circuitry receiving the signal to provide a good reading. The light spot and/or the image of the detector may be scanned across the symbol in such a reader. The rate of scan of the light spot and/or the detector image across the symbol would be high compared to the rate of movement of the reader causing the image of the symbol to move across the zones. If the detector can be small enough and/or the image on the detector can be large enough, the image could extend over all zones without the movement of the reader to move the image over the zones.

In another aspect, the invention consists of a bar code reader for reading bar code symbols disposed at different distances within a range of distances and which includes lens means and detector means disposed in the image space of the lens means and having a plurality of zones. The lens means includes a plurality of regions with different principal planes located at differing displacements from said image space. A bar code symbol disposed at a greater distance within the abovesaid range is conjugate with a respective zone of the detector means through a region of the lens means having its principal plane at a greater displacement from said image space. Such an arrangement has the advantage that a respective zone and a symbol at a respective distance can be conjugate with one another through a respective region of the lens means without the need for having the detector zones at different positions along the optical axis. In other words, the appropriate image distance for an image of the symbol to be in focus on a particular detector zone is not dependent upon positioning the zones at different positions along the axis. It may still be desirable to position the zones at different distances along the optical axis. Having the principal planes differently located with the lens means regions with principal planes at differing distances from the image space has the advantage of rendering the magnifications at each distance of the symbol more nearly uniform. It is known that magnification is given by $$\frac{\text{image distance } (v)}{\text{object distance } (u)}.$$

The effect of moving the principal plane is that $u$ does not increase in equality with increase in symbol distance.

The advantage of tending to make magnification less dependent on symbol distance is that the size of the image of the detector means remains more nearly constant throughout the operating range of symbol distances from the reader.

The present invention also resides in a bar code reader for reading bar code symbols disposed at different distances within a range of distances, which reader includes lens means and detector means, with the lens means including a plurality of regions of different focal lengths. The detector means includes a plurality of zones at differing distances from said lens means whereby a bar code symbol located at any distance within a range of object distances is conjugate with a respective one of said zones through a respective one of said regions of said lens means. In this way, the magnification is more nearly uniform for all distances of said symbols, within said range of object distances, than if the lens means had only one focal length. The ability to make magnification independent of object distance from the reader and to have it more nearly uniform throughout the range of object distances enhances resolution and hence reduces the frequency of bad reads.

The invention also resides in a bar code reader for reading bar code symbols disposed at different distances within a range of distances, including lens means having an optical axis and detector means having a plurality of zones. The lens means is so formed and the lens means and the detector means are so disposed relative to one another that, with the symbol to be read at any of said different distances and at a displacement from the optical axis appropriate for the distance, the symbol and a respective zone of said detector means are conjugate, with the magnification being more nearly uniform for all said different distances than would theoretically be given by the term $$\left( \frac{\text{focal length}}{\text{symbol distance} - \text{focal length}} \right)$$

with the focal length being a constant. The advantages of having magnification independent of symbol distance have been considered above. The lens means may be relatively simple, but in this case, the lens means and the detector means are so disposed relative to one another that the lens is used in an abnormal manner giving high levels of aberration and, in effect, presenting a non-uniform focal length. Alternatively, the lens means may be formed with regions of different focal lengths.

The invention also resides in a bar code reader for reading bar code symbols at different distances within a range of distances, including lens means and detector means, with the lens means having a plurality of regions of different focal lengths, each region having a principal plane. The detector means has a like plurality of detector zones. Each region of the lens means is related to a respective one of the detector zones with the distance of the related detector zone from the principal plane of the related region being such that a symbol at a respective predetermined distance within said range of distances is conjugate with said related detector zone. Each of the lens means regions has associated with it a different predetermined distance from the symbol to be conjugate with the respective region's associated detector zone. By having conjugacy between a symbol at a certain distance and a particular detector zone through a respective lens means region, with each of the lens means regions having differing focal lengths, both a sharp image may be obtained on the detector zone and the magnification may be more nearly constant from differing symbol distances rather than being directly related to symbol distance. These give improved reading.

The invention also resides in a bar code reader for reading bar code symbols at different distances within a range of distances, including lens means and detector means, with the lens means having a first, optical axis and second and third axes orthogonal to one another and to said first axis. The lens means has regions of differing focal lengths. The regions extend across the lens means in directions parallel to the third axis and are relatively inextensive in directions parallel to the second axis. The detector means includes a plurality of detector zones distributed in a direction including a component parallel to second axis and a component parallel to the first axis. Each region of the lens means has a related detector zone with the image distance of the zone being such that a symbol at a predetermined distance is conjugate with the zone. Each of the lens means regions has associated with it a different predetermined distance for the symbol to be conjugate with the respective region's associated detector zone. Such a reader provides advantages of being able to read a symbol successfully over a much greater range of distances than has been possible heretofore.

Stop means may be provided between the lens means and the detector to stop rays other than those which have passed through a particular region of the lens means having originated from a symbol at a particular location, reaching a specific detector zone. In this way, only an in-focus image is created on the detector zone and therefore the modulation is greater than if out-of-focus images were also being created on the zone.

BRIEF DESCRIPTION OF THE DRAWINGS

An embodiment of the present invention will now be described, by way of example, with reference being made to the accompanying drawings, in which.

DETAILED DESCRIPTION OF PREFERRED EMBODIMENTS

Figure 1:
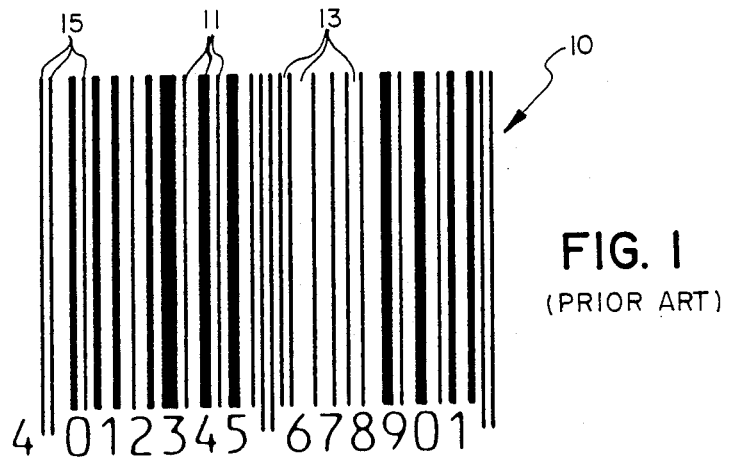
FIG. 1 illustrates a typical bar code symbol.

FIG. 1 illustrates a typical bar code symbol 10 of the Universal Product Code type. As is well known, it consists of parallel dark bars 11 and light spaces 13 of varying widths. In reading the symbol, the reader has to be able to distinguish the bar or space having the smallest width, which is a bar 15.

Figure 2:
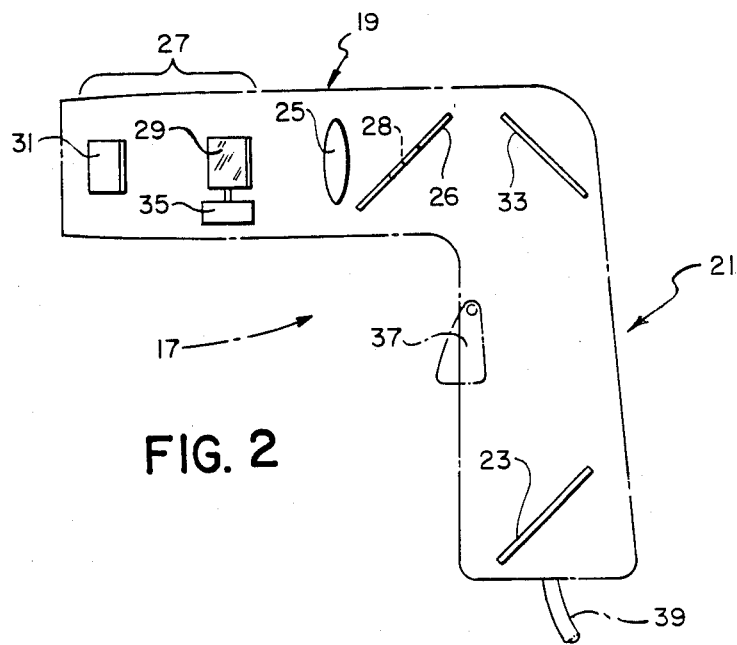
FIG. 2 is a diagrammatic representation of a side view of a hand-held scanning bar code reader embodying the present invention.
Figure 3:
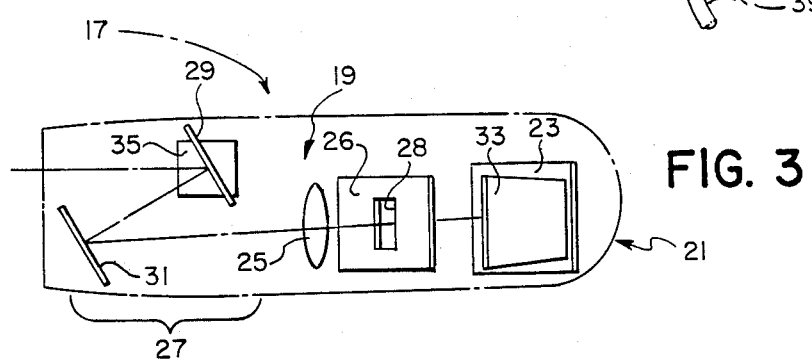
FIG. 3 is a diagrammatic representation of a plan view of the reader represented in FIG. 2.

The reader diagrammatically illustrated in FIGS. 2 and 3, which embodies the present invention, is in the form of a hand-held gun 17. The gun 17 includes a barrel portion 19 and a handle portion 21. The reader is of the type which scans an image of its detector across the symbol and therefore it does not include a source of light to be scanned, as a spot, across the symbol. If desired, it could include a source of general illumination of the symbol but the present embodiment does not.

While the reader is described as being of the type which scans an image of its detector across the symbol, by virtue of the optical reversibility principle, an image of successive portions of the symbol are scanned across the detector, the detector being narrow enough that substantially only the image of a bar or space is on the detector at any time.

As illustrated in FIG. 2, the reader includes a detector 23 located adjacent the foot of the handle portion 21; lens means 25 located in the barrel portion 19; a mirror 33 for folding the ray path between the lens means 25 and the detector 23; a stop 26 having an aperture 28, located between the lens means 25 and the detector 23; and scanning means 27. The scanning means 27 includes an oscillating mirror 29 and a fixed mirror 31. The oscillating mirror 29 deflects rays entering the barrel portion 19 generally parallel to the axis of the barrel portion, onto the fixed mirror 31. The fixed mirror 31, in turn, deflects rays received from the oscillating mirror 29, so that they are again generally parallel to the axis of the barrel portion 19 and pass on through the lens means 25 to be folded by the folding mirror 33 so as to arrive at the detector 23. The oscillating mirror 29 is oscillated by a stepping motor 35.

The reader 17 also includes a trigger switch 37 operable for energizing the stepping motor 35 and the electronic circuitry (not illustrated) which is supplied with signals from the detector 23 along a cable 39 leading from the foot of the handle 21.

The detector 23 includes a plurality of discrete detector zones 41 separated from one another by thin spacers or gaps 43 and arranged in a single row. It is disposed in the foot of the handle 21, in the image space of the lens means, so as to give a large image distance and is oriented so that its length is parallel to the image of a bar 11 or space 13. Its longitudinal axis is inclined to the optical axis as folded by the mirror 33. As is known, the ray path between the lens and the detector may be folded several times to achieve a large image distance within a small housing.

The reader is intended for reading a symbol, such as that illustrated in FIG. 1, with the bars and spaces disposed approximately parallel to the axis of oscillation of the mirror 29.

Figure 4:
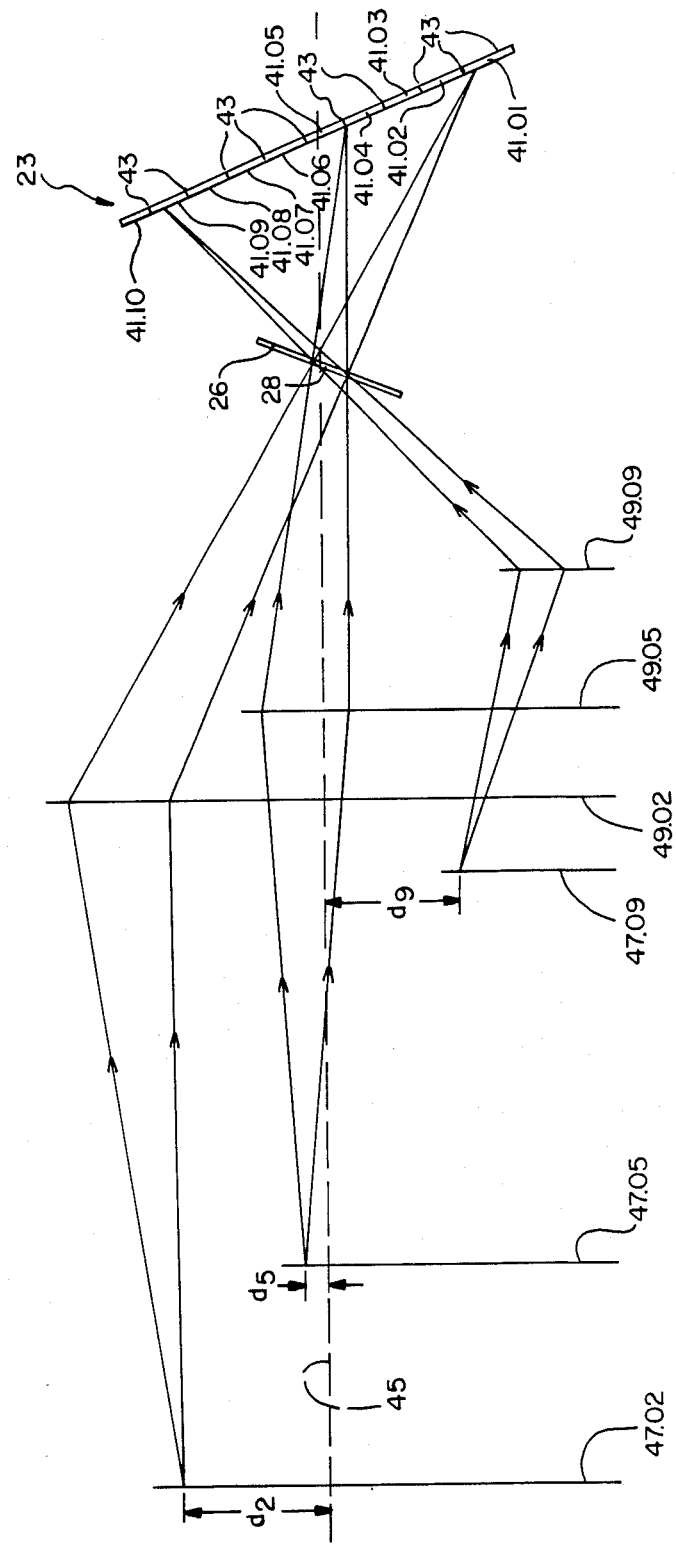
FIG. 4 is an optical ray diagram of the reader illustrated in FIGS. 2 and 3 with scanning and folding mirrors omitted for the sake of ease of understanding.

FIG. 4 diagrammatically illustrates the lens means 25, stop 26 and detector 23. In FIG. 4, there is illustrated an optical axis 45 and three object planes 47.09, 47.05 and 47.02, being a near, an arbitrary, and a far object plane, respectively.

Figure 5:
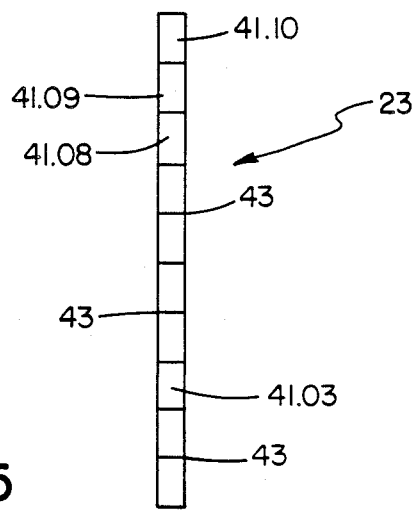
FIG. 5 is a front view of a linear detector included in the reader illustrated in FIGS. 2 and 3.

As illustrated in FIGS. 4 and 5, the detector has ten detector zones 41.01 to 41.10. The lens means has a similar number, i.e. ten, of regions 25.01 to 25.10 (FIG. 6) extensive in directions perpendicular to the plane of the drawing of FIG. 4 but relatively narrow in the plane of the drawing of FIG. 4, i.e. the up and down direction in FIG. 6. Each of the regions has a different focal length and a principal plane 49 located at a different displacement from the image space of the lens means. Three principal planes 49.02, 49.05 and 49.09 are shown.

The detector 23 is so inclined to the optical axis 45 that the detector zone 41.09 is so disposed along, and offset from, the optical axis 45 that, with the principal plane 49.09 disposed as illustrated and with the rays coming only through region 51.09 of the lens means, a bar code symbol located in object plane 47.09 and at distance $d_9$ below the optical axis 45 is sharply imaged on detector zone 41.09. The aperture 26 in the stop 28 is so shaped and the stop is so disposed and oriented that of the rays emanating from a symbol at distance $d_9$ below the optical axis 45 only those which pass through lens means region 51.09 reach the detector zone 41.09.

Similarly, the detector zone 41.05 is so disposed along, and offset from, the optical axis 45 that with the principal plane 49.05 disposed as illustrated and with only those rays coming from the symbol and passing through region 51.05 of the lens means, a bar code symbol located in object plane 47.05 and at distance $d_5$ above the optical axis 45, is sharply imaged on detector zone 41.05. The shape of the aperture 26 in the stop 28 and the disposition and orientation of the stop 28 is again such that of the rays which emanate from a symbol at distance $d_5$ above the optical axis 45 only those which pass through lens means region 51.05 reach the detector zone 41.05.

Similarly, the detector zone 41.02 is so disposed along, and offset from, the optical axis 45 that with the principal plane 49.02 disposed as illustrated and with only those rays coming from the symbol and passing through region 51.02 of the lens means, a bar code symbol located in object plane 47.02 and at distance $d_2$ above the optical axis 45, is sharply imaged on the detector zone 41.02. Again, the shape of the aperture 26 in the stop 28 and the disposition and orientation of the stop 28 is such that of the rays which emanate from a symbol at distance $d_2$ above the optical axis only those which pass through lens means region 51.02 reach the detector zone 41.02.

Other principal planes, object planes and detector zones are so related spacially to one another and the power of the associated lens means region that sharp images found on respective detector zones from symbols at respective unique locations within a range of distances. The principal planes further from the image space are associated with more distant symbols.

Known means (not illustrated) are provided for scanning the outputs of the zones of the detector. The rate of scan of the zone outputs is sufficiently fast, relative to the oscillation of the mirror 29, that several scans of the detector 23 occur during each step in the oscillatory motion of the mirror 29, i.e., during the time that the image from each direction is being applied to the zones. Also, the rate of oscillation of the mirror 29 is sufficiently fast that as the plane of scan of the detector image is swept across the symbol in a direction generally parallel to the length of the bars and spaces, the image of the symbol is resident on each detector zone for a plurality of scans of each zone. Electronic circuitry (not illustrated) is provided for distinguishing the zone output signal with the highest modulation. The zone with the highest modulation will be the zone which is conjugate with the symbol and hence has the sharpest symbol image on it. Also, because the focal length of the lens region which is providing conjugacy between a symbol at a certain distance and a respective detector zone increases as the symbol distance increases, so the magnification is more nearly uniform than if the lens means had only a single effective focal length. This is advantageous because the width of a detector zone has to be less than the width of the image of the narrowest bar or space when the image of the symbol is at its smallest. While such a narrow detector is technically feasible its area is small, it is difficult to fabricate and there is more variability in the areas of the zones. If the range of magnifications encountered for a given range of symbol distances, can be reduced, the width of the detector can be increased.

The shifting of the principal plane of each lens region towards the symbol as the focal length of the region increases, helps keep the physical size of the reader reasonable. The magnification can be expressed as $$\text{magnification} = \frac{\text{image distance } (v)}{\text{object distance } (u)}$$

which can also be expressed as $$\left( \frac{\text{focal length}}{\text{object distance} - \text{focal length}} \right).$$

If variation in magnification is reduced, by increasing focal length as the symbol distance increases, the image distance inevitably increases also. The increased image distance could be accommodated by putting the detector zones associated with greater object (symbol) distances at greater distances from the lens means. However, the physical size of the reader can be kept acceptable by accommodating at least some of the increased image distance by moving the principal plane towards the object. The shift of the principal plane towards the object also reduces the object distance (u) and this is beneficial to gaining a more nearly uniform magnification.

While the lens means has been described as having regions of differing focal lengths, it is to be understood that the regions need not be discrete and distinct—the regions could merge and the focal length could change continuously rather than in increments.

Given the principals and parameters identified above, it is within the skill of the art to design suitable lens means and stop means for inclusion in specific embodiments of the present invention and further detail will not be given herein. Those skilled in the art of designing and making eyeglass lenses are well versed in making lenses with regions of different power so that as the wearer scans his or her eyes vertically the eyes are subjected to successively different lens powers.

At large symbol distances the depth of focus of the lens means region associated with such large symbol distances may be so great that objects for a large distance behind the symbol may be in focus on the detector zone and may tend to confuse the reading. To avoid this situation, the aperture in the stop may be made elongate in a direction parallel to the direction in which the lens means regions are elongate. This has an effect, similar to opening up the iris of a camera, of reducing the depth of focus.

For a given distance between the stop and a zone of the detector, the area of the stop controls the energy incident on the detector zone. While advantages may be gained by elongating the zone, to decrease depth of focus and to increase the energy incident on the zone, increasing the height of the aperture may cause undesirable spreading onto adjacent zones. The variable distance of the stop to the detector, the tilt of the detector and the tilt of the stop and its shape provide many parameters employable in controlling the ratio of the signal strength to symbol distance.

In the above-described embodiment of the invention the focal length and the principal plane of each lens means region vary. It is to be understood that in some embodiments of the present invention only the position of the principal plane of each region may vary and in other embodiments only the focal length of each region may vary.

Instead of lens means with regions having differing focal lengths and/or principal planes, a lens having nominally only one focal length and one focal plane may be used in such a manner that aberrations are encountered which lead, in effect, to different focal lengths.

Figure 6:
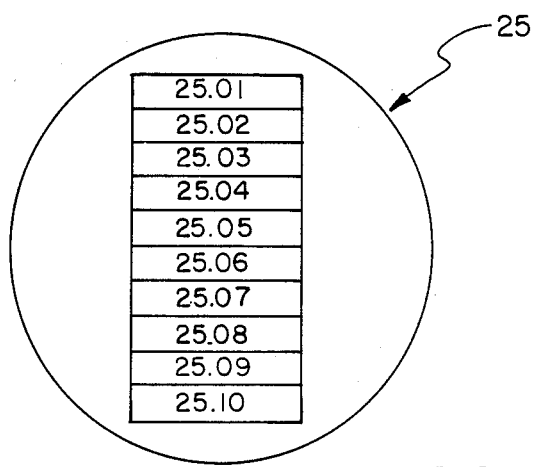
FIG. 6 diagrammatically represents lens means, and regions thereof, included in the reader.

While the regions 25.01–25.10 of the lens means have been shown in FIG. 6 as being disposed in sequence directly related to increasing symbol distance, it may be desirable for optical reasons to have the regions associated with the smallest symbol distances at the central region of the lens means and to progress outwards therefrom. The regions could progress outwards at both sides of the central region, which would require an appropriate positioning of the detector zones, or they could progress outwards at only one side of the central region so that, in fact, only half the lens is used.

The embodiment described above and illustrated in the drawings is intended to be moved as a whole, in use, so that the plane of the scanning image of the detector is swept down across the symbol in a direction parallel to the bars and spaces. This sweeping motion is necessary because conjugacy between a symbol at a particular distance and an associated detector zone through a related lens region is achieved only when the symbol is displaced from the optical axis of the lens means by a particular distance ($d_{1-10}$). Such displacement distances ($d_{1-10}$) are different for each associated pair of lens means regions and detector zones. In other embodiments, the need to sweep the reader as a whole may be avoided by providing a second oscillating mirror for causing a scan in a direction orthogonal to the scan created by the mirror 29.

What is claimed is:

1. A bar code reader for reading bar code symbols disposed at different distances within a range of distances, including:
   lens means; and
   detector means disposed in the image space of said lens means and having a plurality of zones;
   said lens means including a plurality of regions with different principal planes located at differing displacements from said image space whereby a bar code symbol disposed at a greater distance within said range is conjugate with a respective zone of said detector means through a region of said lens means having its principal plane at a greater displacement from said image space.

2. A bar code reader as claimed in claim 1, wherein said regions of said lens means also have different focal lengths, the regions with principal planes displaced by greater distances from said image space having the greater focal lengths.

3. A bar code reader as claimed in Claim 1, wherein said zones of said detector means are disposed in a row inclined to a plane perpendicular to the optical axis of said lens means.

4. A bar code reader as claimed in claim 2, wherein said lens means has an axis and said symbol is at distance x along said axis and at displacement y laterally from said axis when it is conjugate with a particular zone of said detector means through a respective region of said lens means, said reader further including:
   stop means for stopping incidence upon said particular zone of light rays derived from said symbol at distance x and displacement y which have passed through regions of said lens means other than said respective region.

5. A bar code reader for reading bar code symbols disposed at different distances within a range of distances including:
   lens means; and
   detector means;
   said lens means including a plurality of regions of differing focal lengths, each region having a principal plane;
   said detector means including a plurality of zones, each region being related to a respective one of said zones, each zone being disposed at such a distance from the principal plane of its related lens means region that a bar code symbol at a particular distance from said principal plane is conjugate with said zone through its related lens means region, each of said particular distances corresponding to a different distance of the symbol from said lens means, whereby the magnification is more nearly uniform for all distances of said symbols, within said range of distances, than if said lens means had only one focal length.

6. A bar code reader as claimed in claim 5, wherein said principal planes are located differently.

7. A bar code reader as claimed in claim 6 wherein said lens means has an axis and said symbol is at distance x along said axis from said principal plane and at displacement y laterally from said axis when it is conjugate with a particular zone through its related lens means region, said reader further including:
  stop means for stopping incidence upon said particular zone of light derived from said symbol at distance x and displacement y which have passed through regions of said lens means other than the region related to said particular zone.

8. A bar code reader as claimed in claim 7, including scanning means including a mirror and means for oscillating said mirror, said mirror being disposed at the side of said lens means remote from said detector and being adapted, upon energization of said oscillating means, to reflect into a space in which a symbol may be disposed, a scanning image of said detector.

9. A bar code reader for reading bar code symbols disposed at different distances within a range of distances, including
  lens means having an axis; and
  detector means having a plurality of zones;
  said lens means being so formed and said lens means and said detector means being so disposed relative to one another that, with the symbol to be read at any of said different distances and at a displacement from said axis appropriate for said distance, the symbol and a respective zone of said detector means are conjugate, with the magnification being more nearly uniform for all said different distances than would be theoretically given by the term $$\left( \frac{\text{focal length}}{\text{symbol distance} - \text{focal length}} \right)$$

with the focal length being a constant.

10. A bar code reader for reading bar code symbols at different distances within a range of distances, including:
  lens means; and
  detector means;
  said lens means having a plurality of regions of different focal lengths, each region having a principal plane;
  said detector means having a like plurality of detector zones;
  each said region of said lens means being related to a respective one of said detector zones with the distance of the related detector zone from the principal plane of the related region being such that a symbol at a respective predetermined distance within said range of distances is conjugate with said related detector zone, each of said lens means regions having associated with it a different predetermined distance for the symbol to be conjugate with the respective region's associated detector zone.

11. A bar code reader as claimed in claim 10, further including:
  stop means;
  said stop means being adapted to pass to a detector zone only those rays originating from a symbol at said respective predetermined distance which have passed through the lens means region associated with the detector zone and stopping rays originating from the symbol and which have passed through other lens means regions and which are directed towards the detector zone.

12. A bar code reader as claimed in claim 11, wherein said detector zones are located other than in a plane parallel to said principal planes.

13. A bar code reader as claimed in claim 10, wherein said principal planes are different, the principal planes of the regions associated with the larger of said predetermined distances being further from said detector means.

14. A bar code reader as claimed in claim 11, including:
  scanning means including a mirror and means for oscillating said mirror, said mirror being disposed at the side of said lens means remote from said detector and being adapted, upon energization of said oscillating means, to reflect into a space in which a symbol may be disposed, a scanning image of said detector.

15. A bar code reader for reading bar code symbols at different distances within a range of distances, including
  lens means; and
  detector means;
  said lens means having a first, optical axis and second and third axes orthogonal to one another and to said first axis;
  said lens means having regions of differing focal lengths, said regions extending across the lens means in directions parallel to said third axis and being relatively inextensive in directions parallel to said second axis;
  said detector means including a plurality of detector zones distributed in a direction including a component parallel to said second axis and a component parallel to said first axis; each region of the lens means having a related detector zone with the image distance of the zone being such that a symbol at a predetermined distance is conjugate with the zone, each of said lens means regions having associated with it a different predetermined distance for the symbol to be conjugate with the respective region's associated detector zone.

* * * * *